(12) United States Patent
Aoki et al.

(10) Patent No.: US 6,212,064 B1
(45) Date of Patent: Apr. 3, 2001

(54) SOLID ELECTROLYTIC CAPACITOR AND PRODUCTION METHOD OF THE SAME

(75) Inventors: Yuji Aoki; Kennji Araki; Takashi Fukaumi; Kennichi Takahashi; Daisuke Takada, all of Shimoniikawa-gun (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/288,501

(22) Filed: Apr. 8, 1999

(30) Foreign Application Priority Data

Apr. 13, 1998 (JP) .................................................. 10-101186

(51) Int. Cl.$^7$ ........................................................ H01G 9/00
(52) U.S. Cl. ............................ 361/523; 361/532; 29/25.03
(58) Field of Search ..................................... 361/523, 524, 361/525, 529, 532; 2542/500, 62.2; 29/25.03

(56) References Cited

U.S. PATENT DOCUMENTS

| 3,337,429 | * | 8/1967 | Zind | 361/523 |
| 3,538,395 | * | 11/1970 | Riley | 361/523 |
| 3,823,347 | * | 7/1974 | Karlik, Jr. | 361/523 |
| 5,621,608 | * | 4/1997 | Arai et al. | 361/525 |

FOREIGN PATENT DOCUMENTS

| 2-166715 | 6/1990 | (JP) . |
| 8-162371 | 6/1996 | (JP) . |

* cited by examiner

*Primary Examiner*—Anthony Dinkins
(74) *Attorney, Agent, or Firm*—Sughrue, Mion, Zinn, Macpeak & Seas, PLLC

(57) ABSTRACT

The object of the present invention is to provide a solid electrolytic capacitor which can prevent an oxidation degradation of a solid electrolyte caused by heat stress and the like during packaging, which has low an ESR, and a production method of the same; in order to achieve this object, the solid electrolytic capacitor of the present invention includes in order an anode, a dielectric coat, a solid electrolyte layer, and a conductive paste layer, with a conductive polymer is used as the solid electrolyte, wherein the conductive paste layer contains acrylic resins and cellulose resins as a binder, and the thickness of the conductive paste layer is in a range of 20 to 40 $\mu$m.

13 Claims, 1 Drawing Sheet

SOLID ELECTROLYTIC CAPACITOR AND PRODUCTION METHOD OF THE SAME

BACKGROUND OF THE INVENTION

1. Field of the Invention

The present invention relates to a solid electrolytic capacitor in which a solid electrolyte is a conductive polymer, and a production method of the same.

This application is based on patent application No. Hei 10-101186 filed in Japan, the content of which is incorporated herein by reference.

2. Description of the Related Art

Metallic oxides such as manganese dioxide, tetracyanoquinodimethane complex, and the like have been used as a solid electrolyte comprising a solid electrolytic capacitor, and recently, a solid electrolytic capacitor in which a solid electrolyte is used as a conductive polymer (abbreviated as "solid electrolytic capacitor") has been suggested.

One characteristic of the solid electrolytic capacitor is that the equivalent series radiation (abbreviated as "ESR") is low. In order to make the ESR of the solid electrolytic capacitor low, it is necessary that the ESR of a cathode layer is also low; therefore, a thermosetting graphite paste layer (abbreviated as "Gr paste layer") is used to the cathode layer.

However, conductive polymers which are organic semiconductors are used as solid electrolytes in the conventional solid electrolytic capacitors. Therefore, when the solid electrolytic capacitor is left in air at high temperatures for long periods, the solid electrolyte is oxidation degraded, and then the ESR thereof becomes high.

That is, the thermosetting materials used in a Gr paste layer comprising a conventional solid electrolytic capacitor generally does not have heat resistance. Temperature stress generatied in packaging makes cracks and peels in the Gr paste layer; therefore, oxygen access channels are newly formed therein. Consequently, the solid electrolyte layer comprised of a conductive polymer is easily oxidization degraded.

Moreover, in order to make the ESR of the solid electrolytic capacitor low, Japanese Patent Application, First Application No. Hei- 08-162371, paid attentions to improving the contact between the Gr layer and the conductive layer. The application suggested that the solid electrolytic capacitor in which the Gr layer contains the graphite paste comprising acrylic resins. In addition, the solid electrolytic capacitor comprising the Gr layer having a thickness in a range of 5 to 10 μm, which is thinner than the thickness of the conventional Gr layer, is suggested. The object could be achieved, because the Gr layer having such thickness acts as a grounding for the conductive layer, that is, has an anchoring effect for the conductive layer.

It is therefore an object of the present invention to provide a solid electrolytic capacitor which can prevent an oxidation degradation of a solid electrolyte caused by heat stress and the like during packaging, which has low an ESR, and a production method of the same.

SUMMARY OF THE INVENTION

The present invention relates to a solid electrolytic capacitor comprising in order an anode, a dielectric coat, a solid electrolyte layer, and a conductive paste layer, with a conductive polymer used as the solid electrolyte, wherein the conductive paste layer comprises acrylic resins and cellulose resins as a binder, and the thickness of the conductive paste layer is in a range of 20 to 40 μm.

Moreover, the present invention also relates to a production method of the solid electrolytic capacitor comprising the steps of forming a dielectric coat onto an anode, forming a solid electrolyte layer comprising a conductive polymer, and forming a conductive paste layer with a thickness in a range of 20 to 40 μm, and which comprises acrylic resins and cellulose resins as a binder onto the solid electrolyte layer.

DETAILED DESCRIPTION OF THE PREFERRED EMBODIMENTS

Figure 1:
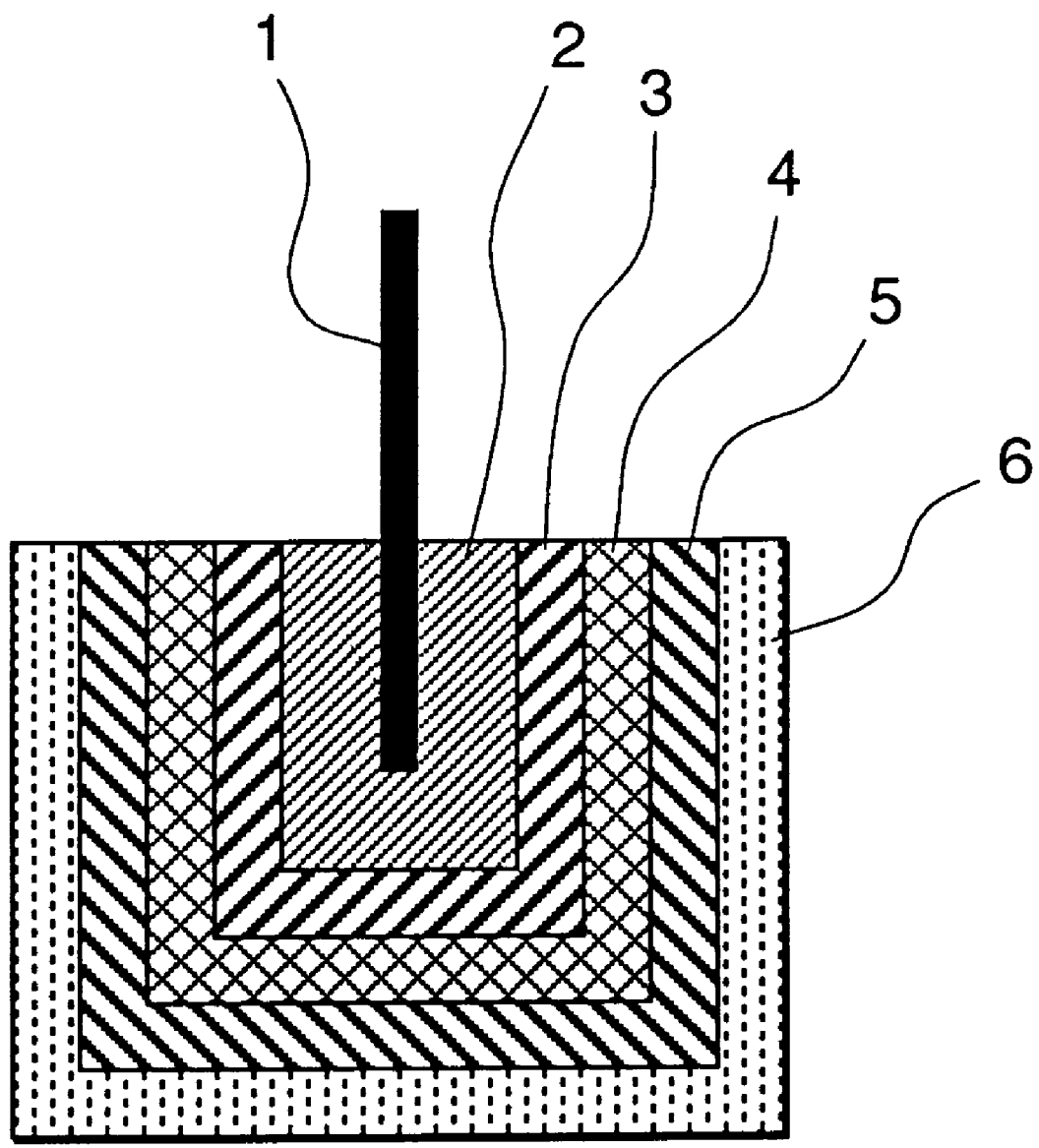
FIG. 1 is a cross-sectional view showing one preferred embodiment of a solid electrolytic capacitor of the present invention.

In FIG. 1, reference number 2 denotes the anode in which the anode lead 1 stands upright, reference number 3 denotes the dielectric coat, reference number 4 denotes the solid electrolyte layer comprising a conductive polymer, reference number 5 denotes the conductive paste layer, and reference number 6 denotes the cathode conductive layer. The conductive paste layer 5 and the cathode conductive layer 6 act as a cathode.

Conductive polymers such as dielectric materials of polypyrrole, polythiophene, polyaniline, polyfuran, and the like can be used to the solid electrolyte layer 4. Among these conductive polymers, polypyrrole is preferable because of its stability.

The conductive paste layer 5 is formed outside of the solid electrolyte layer 4, and prevents the contact between the outer air and the solid electrolyte layer 4, and thereby, the oxidation degradation of the solid electrolyte layer 4 can be prevented. Therefore, the conductive paste layer 5 is an important element for forming the capacitor.

In order to prevent the oxidation degradation of the solid electrolyte layer 4, and to keep the ESR low, it is necessary to keep the resistance of the conductive paste layer 5 low, and to set the thickness thereof sufficiently thick so as not to generate cracks and peels by heat stress generated when it is packed.

The conductive paste layer 5 uses acrylic resins as a main component mixed with cellulose resins as the binder. When the mixture is used as the binder, the dispersibility of the conductive powders such as graphite and the like becomes excellent and the resistance of the conductive paste layer 5 becomes low. In addition, the thickness of the conductive paste layer 5 is set in a range of 20 μm to 40 μm. Thereby, the cracks and peels generated when it is packed can be prevent, and the oxidation degradation of the electrolyte can be prevented; therefore, the ESR can be kept low.

The conductive paste used in the present invention is a mixture comprising acrylic resins and cellulose resins as a binder. The content of cellulose resins in the binder is preferably in a range of 10 to 30 weight %. As shown in Table 2 below, when the content of cellulose resins is less than 10 weight %, the dispersibility of the conductive powders such as graphite and the like becomes low; therefore, the ESR tends to be high. In contrast, when the content of cellulose resins is more than 30 weight %, cracks and peels are generated in the conductive paste layer 5 by heat stress generated during packing, and the oxygen access channels are easily formed therein: therefore, the solid electrolyte layer 4 is easily oxidation degraded. As a result, the ESR tends to be high.

As shown in Table 3 below, when the thickness of the conductive paste layer 5 is less than 20 μm, the cracks and peels are generated in the conductive paste layer 5 by heat stress generated during packing and the oxygen access channels are formed therein: therefore, the solid electrolyte layer 4 is easily oxidation degraded. When the thickness thereof becomes thicker, the size of the element becomes larger; therefore, the element is easily exposed from the exterior packaging resin, and the solid electrolyte layer 4 is easily oxidation degraded. Therefore, the thickness of the conductive paste layer 5 is preferably in a range of 20 to 40 μm, because the conductive paste layer 5 having a thickness in this range has a mitigation effect for heat stress generated when it is packed.

Ordinary acrylic resins can be used as the acrylic resins comprising the conductive paste layer 5; however, methyl polymethacrylate and ethyl polymethacrylate are preferable. In addition, acrylic resins comprising copolymers other than these acrylic copolymers can be used as long as the effects obtained by the present invention can be obtained. Acrylic resins used for molding materials are preferable considering their facilitation of production. Moreover, the average molecular weight of acrylic resins is preferably in a range of 10,000 to 1,000,000, more preferably in a range of 50,000 to 500,000, most preferably in a range of 50,000 to 200,000.

Ordinary cellulose resins can be used as cellulose resins comprising the conductive paste layer 5; however, cellulose resins; cellulose ester resins such as nitrocellulose, acetylcellulose, acetylbutylcellulose, propionylcellulose; cellulose ether resins such as ethylcellulose; and the like are preferable. Among these cellulose resins, acetylcellulose is more preferable. Moreover, the average molecular weight of cellulose resins is preferably in a range of 10,000 to 1,000,000, more preferably in a range of 20,000 to 200,000.

EXPERIMENTAL EXAMPLES

The present invention will now be explained using the Examples and Comparative Example.

Example 1

As shown in FIG. 1, the dielectric coat 3 which comprises $Ta_2O_5$ was formed onto the surface of the anode 2 in which the Ta wire stands upright, then the polypyrrole layer 4 which was the solid electrolyte layer was formed.

After that, Gr paste was obtained by mixing 5 weight % of the binder comprising methyl polymethacrylate and acetylcellulose at a weight ratio of 4:1, 15 weight % of graphite, and 80 weight % of pure water.

The anode 2 laminated with the dielectric coat 3 and the polypyrrole layer 4 was dipped into the obtained Gr paste at several times to form the layer comprising Gr paste with a thickness of 30 μm onto the polypyrrole layer 4. Then, the Gr paste layer 5 was formed by curing the layer comprising Gr paste at a high temperature of 150° C., for 30 minutes.

After that, the solid electrolytic capacitor was obtained by forming the Ag paste layer 6 onto the Gr paste layer 5.

Comparative Example

A comparative solid electrolytic capacitor was prepared in a manner identical to that of Example 1 of the present invention, except that the Gr paste layer 5 comprising methyl polymethacrylate alone, which is a conventional binder, with a thickness of 10 μm was formed.

The high temperature- no load test at 85° C. was carried out using the obtained solid electrolytic capacitors in Example 1 and Comparative Example, and the ESR transitions by the oxidation degradation of the solid electrolyte were compared. The results are shown in Table 1 below.

TABLE 1

| | ESR (mΩ) | | | | |
| --- | --- | --- | --- | --- | --- |
| | initial value | After 250 hours | After 500 hours | After 750 hours | After 1000 hours |
| Example 1 | 175 | 210 | 250 | 285 | 325 |
| Comparative Example 1 | 300 | 375 | 455 | 580 | 655 |

As shown in Table 1, the ESR transition of the solid electrolytic capacitor in Example is small; therefore, the solid electrolytic capacitor in Example 1 has a higher reliability than that of the solid electrolytic capacitor in the Comparative Example. In addition, it is confirmed that the effect of preventing the oxidation degradation of the solid electrolyte layer 4 can be obtained by the solid electrolytic capacitor in Example 1.

Example 2

The solid electrolytic capacitors were prepared in a manner identical to that of Example 1 of the present invention, except that the content of cellulose resin in the binder comprising the conductive paste layer 5 was varied in a range of 0 to 80 weight %, as shown in Table 2 below.

Initial ESRs and ESRs after packing were measured. The "ESRs after packing" means ESRs of the solid electrolytic capacitors which are fixed to the glass-epoxy substrate (thickness: 1 mm; size: 100 mm×100 mm) with a cream solder, and passed through a Reflow Oven having a temperature profile type which can maintain a temperature at 240° C. for 10 seconds. The results are shown in Table 2 below.

TABLE 2

| | The content of cellulose in the binder (weight %) | | | | | | | | |
| --- | --- | --- | --- | --- | --- | --- | --- | --- | --- |
| | 0 | 10 | 20 | 30 | 40 | 50 | 60 | 70 | 80 |
| The initial ESR (mΩ) | 250 | 120 | 95 | 90 | 90 | 90 | 90 | 90 | 90 |
| After packing (mΩ) | 300 | 180 | 175 | 180 | 200 | 240 | 280 | 300 | 350 |

It is clear from Table 2 that the content of cellulose resins in the binder is preferably in a range of 10 to 30 weight %.

Example 3

The solid electrolytic capacitors were prepared in a manner identical to that of Example 1 of the present invention, except that the thickness of the Gr paste layer 5 was varied in a range of 10 to 50 μm as shown in Table 3 below.

Initial ESRs and ESRs after packing were measured. The "ESRs after packing" means the ESRs of the solid electrolytic capacitors which are fixed to the glass-epoxy substrate (thickness: 1 mm; size: 100 mm×100 mm) with a cream solder, and passed through a Reflow Oven having a temperature profile type which can maintain a temperature at 240° C. for 10 seconds. The results are shown in Table 3 below.

TABLE 3

|  | The thickness of the Gr paste layer (μm) | | | | |
| --- | --- | --- | --- | --- | --- |
|  | 10 | 20 | 30 | 40 | 50 |
| The initial ESR (mΩ) | 85 | 90 | 95 | 100 | 10 |
| After packing (mΩ) | 210 | 180 | 175 | 180 | 185 |

It is clear from Table 3 that the thickness of the Gr paste layer 5, that is, conductive paste layer 5, is preferably in a range of 20 to 40 μm.

What is claimed is:

1. A solid electrolytic capacitor comprising in order an anode, a dielectric coat, a solid electrolyte layer, and a conductive paste layer with a conductive polymer is used as the solid electrolyte, wherein the conductive paste layer contains acrylic resins and cellulose resins as a binder, and the thickness of the conductive paste layer is in a range of 20 to 40 μm.

2. A solid electrolytic capacitor as claimed in claim 1, wherein the content of cellulose resins in the binder is in a range of 10 to 30 weight %.

3. A solid electrolytic capacitor as claimed in claim 2, wherein the conductive polymer is one polymer selected from the group consisting of polypyrrole, polythiophene, polyaniline, and polyfuran.

4. A solid electrolytic capacitor as claimed in claim 3, wherein the conductive paste layer is a graphite paste layer.

5. A solid electrolytic capacitor as claimed in claim 1, wherein the average molecular weight of acrylic resins in the conductive paste layer is in a range of 10,000 to 1,000,000.

6. A solid electrolytic capacitor as claimed in claim 5, wherein the average molecular weight of acrylic resins in the conductive paste layer is in a range of 50,000 to 500,000.

7. A solid electrolytic capacitor as claimed in claim 6, wherein the average molecular weight of acrylic resins in the conductive paste layer is in a range of 50,000 to 200,000.

8. A solid electrolytic capacitor as claimed in claim 1, wherein the cellulose resins are cellulose ester resins.

9. A solid electrolytic capacitor as claimed in claim 8, wherein the cellulose ester resins are acetyl cellulose resins.

10. A solid electrolytic capacitor as claimed in claim 1, wherein the average molecular weight of cellulose resins in the conductive paste layer is in a range of 10,000 to 1,000,000.

11. A solid electrolytic capacitor as claimed in claim 10, wherein the average molecular weight of cellulose resins in the conductive paste layer is in a range of 20,000 to 200,000.

12. A production method for a solid electrolytic capacitor comprising the steps of forming a dielectric coat onto an anode, forming a solid electrolyte layer comprised of conductive polymer onto the dielectric coat, and forming a conductive paste layer with a thickness is in a range of 20 to 40 μm, and which is comprised of acrylic resins and cellulose resins as a binder onto the solid electrolyte layer.

13. A production method for a solid electrolytic capacitor as claimed in claim 12, wherein the content of cellulose in the binder is in a range of 10 to 30 weight %.

* * * * *